(12) United States Patent  
Keenan

(10) Patent No.: US 12,442,755 B2  
(45) Date of Patent: Oct. 14, 2025

(54) SENSOR PURGE TECHNIQUES AND RELATED SYSTEMS AND METHODS

(71) Applicant: Formlabs, Inc., Somerville, MA (US)

(72) Inventor: Justin Keenan, Lexington, MA (US)

(73) Assignee: Formlabs, Inc., Somerville, MA (US)

( * ) Notice: Subject to any disclaimer, the term of this patent is extended or adjusted under 35 U.S.C. 154(b) by 1183 days.

(21) Appl. No.: 17/168,132

(22) Filed: Feb. 4, 2021

(65) Prior Publication Data

US 2021/0239535 A1    Aug. 5, 2021

Related U.S. Application Data

(60) Provisional application No. 62/970,352, filed on Feb. 5, 2020.

(51) Int. Cl.
```
G01N 21/15    (2006.01)
F01N 13/08    (2010.01)
G01J 5/05     (2022.01)
G01J 5/0875   (2022.01)
```

(52) U.S. Cl.
CPC ............ *G01N 21/15* (2013.01); *F01N 13/08* (2013.01); *G01J 5/0875* (2013.01); *G01J 5/051* (2022.01)

(58) Field of Classification Search
None
See application file for complete search history.

(56) References Cited

U.S. PATENT DOCUMENTS

| | | | | |
|---|---|---|---|---|
| 2003/0142403 A1* | 7/2003 | Kalley | ............. | G01J 5/041 |
| | | | | 359/507 |
| 2010/0238446 A1* | 9/2010 | Akiyama | ............. | G01N 21/05 |
| | | | | 356/246 |
| 2011/0180694 A1* | 7/2011 | Leuthold | ............. | G07D 7/12 |
| | | | | 134/37 |
| 2013/0052291 A1 | 2/2013 | Morikawa | | |
| 2017/0297109 A1 | 10/2017 | Gibson et al. | | |
| 2018/0126460 A1 | 5/2018 | Murphree et al. | | |
| 2018/0186067 A1 | 7/2018 | Buller et al. | | |

(Continued)

FOREIGN PATENT DOCUMENTS

| | | |
|---|---|---|
| EP | 3 441 213 A1 | 2/2019 |
| EP | 3 572 213 A1 | 11/2019 |

OTHER PUBLICATIONS

International Preliminary Report on Patentability mailed Aug. 18, 2022 in connection with International Application No. PCT/US2021/016572.

(Continued)

*Primary Examiner* — Kaj K Olsen  
*Assistant Examiner* — Pradhuman Parihar  
(74) *Attorney, Agent, or Firm* — Michael J. Attisha; Greenberg Traurig, LLP

(57) ABSTRACT

Techniques for preventing contamination of an electronic component via gas flow are described. According to some aspects, an electronic component module is configured to provide gas flow past and away from an electronic component such that thermal and material exchange is limited between the electronic component module and a coupled system. In some embodiments, the coupled system may be a portion of an additive fabrication device. As a result, a reduced number of contaminants may adhere to the electronic component, extending its lifespan and reducing maintenance.

28 Claims, 9 Drawing Sheets

(56) References Cited

U.S. PATENT DOCUMENTS

2018/0257977 A1\* 9/2018 Nagashima ............... C03C 3/32
2019/0358905 A1\* 11/2019 Werner .................. G06T 17/30

OTHER PUBLICATIONS

International Search Report and Written Opinion mailed May 31, 2021 in connection with International Application No. PCT/US2021/016572.

\* cited by examiner

SENSOR PURGE TECHNIQUES AND RELATED SYSTEMS AND METHODS

CROSS-REFERENCE TO RELATED APPLICATIONS

The present application claims the benefit under 35 U.S.C. § 119 (e) of U.S. Provisional Patent Application No. 62/970,352, filed Feb. 5, 2020, titled "Sensor Purge Techniques and Related Systems and Methods," which is hereby incorporated by reference in its entirety.

BACKGROUND

Electronic components are sometimes placed in environments in which contaminants such as particulates are present. It may be undesirable for these particulates to adhere to, or otherwise interfere with, such an electronic component. For instance, an electronic component that includes a sensor may operate with a reduced effectiveness if contaminated in this way.

SUMMARY

According to some aspects, an electronic component module is provided, the electronic component module comprising at least one gas intake channel, a primary channel coupled to the at least one gas intake channel and comprising an orifice at a first end, an electronic component arranged at least partially within the primary channel at a second end of the primary channel, the second end opposing the first end of the primary channel, and at least one gas exhaust channel coupled to a first side of the primary channel, wherein the at least one gas exhaust channel is oriented away from the electronic component.

According to some aspects, a method of purging an electronic component module is provided, the method comprising directing a gas through a primary channel of the electronic component module and past an electronic component arranged at least partially within the primary channel and directing the gas from the primary channel away from the electronic component and out of the electronic component module through at least one gas exhaust channel coupled to a side of the primary channel.

According to some aspects, an additive fabrication device configured to produce three-dimensional objects by sintering a source material is provided, the additive fabrication device comprising a chamber, a material deposition mechanism, a fabrication platform arranged within the chamber configured to receive source material from the material deposition mechanism, and an electronic component module coupled to the chamber opposite the fabrication platform. The electronic component module comprises at least one gas intake channel, a primary channel coupled to the at least one gas intake channel and comprising an orifice at a first end, an electronic component arranged at least partially within the primary channel at a second end of the primary channel, the second end opposing the first end of the primary channel, and at least one gas exhaust channel coupled to a side of the primary channel, wherein the at least one gas exhaust channel is oriented away from the electronic component.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
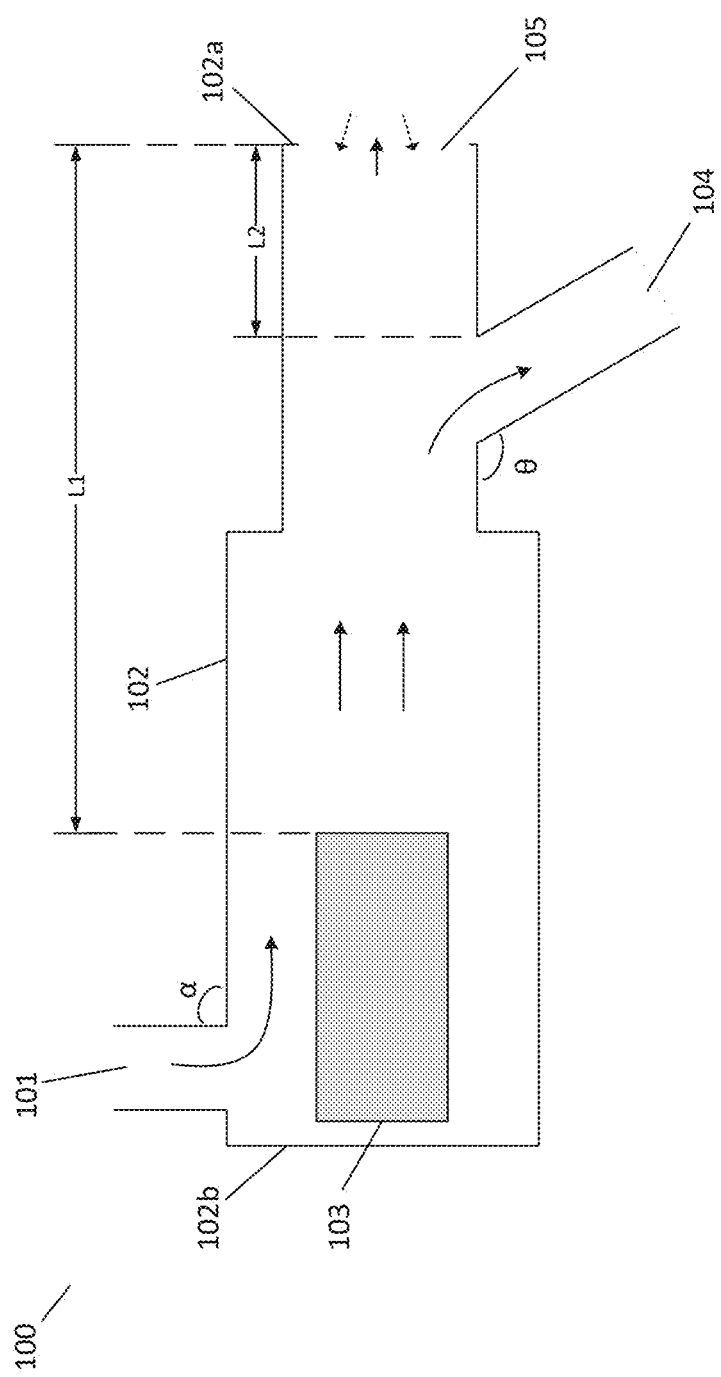
FIG. 1 depicts an illustrative electronic component module, according to some embodiments.

In some applications, electronic components can come into contact with contaminants such as particulates and/or other atmospheric hazards such as vaporized chemicals. Without preventative measures, these contaminants can adhere to the electronic components over time, potentially causing degradation of the electronic components and/or the electronic components' ability to perform their desired function. While one solution may be to periodically replace or clean the electronic components, such periodic maintenance may be expensive, may interfere with calibrated systems, and/or may be otherwise undesirable to a user.

As an illustrative example of an application in which such contamination may occur, some additive fabrication techniques such as Selective Laser Sintering (SLS) form parts by fusing a source material such as a fine powder together into larger solid masses. Typically the powder is preheated and a laser beam is directed at the powder to cause consolidation of the powder. Maintaining the powder at an elevated temperature can, however, cause the powder material and/or system components to outgas contaminants that were previously trapped in the powder. This outgassed material may be drawn toward electronic components of the additive fabrication apparatus and may condense or otherwise deposit contamination on the electronic component. In the case of an optical sensor, for example, contamination may be deposited on an optical window of the optical sensor, which may reduce the optical sensor's ability to accurately perform sensing (e.g., monitoring the temperature of the source material via infrared optical sensing, monitoring the progress of object formation using a camera, etc.).

Some conventional systems may employ gas purge techniques, such as an air knife, to prevent the accumulation of contaminants on an electronic component. An air knife uses a high-intensity, uniform sheet of laminar airflow to remove or prevent contaminants from adhering to a surface by directing the sheet of laminar airflow over the surface.

However, in applications where such purging gas flow is coupled to another system, such techniques can result in significant thermal exchange between the cooler gas of the purging mechanism and the coupled system. In some applications, such thermal exchange may be undesirable because the coupled system may need to be maintained within a particular range of temperatures, and operating the gas purge may make it difficult or impossible to maintain such temperatures in view of said thermal exchange.

The inventors have recognized and appreciated that a purging gas may be directed around and away from an electronic component to prevent contamination from adhering to the electronic component. In particular, the inventors have recognized that the gas exhaust mechanism may be shaped, oriented or otherwise configured to harness the Coandă effect and to direct the gas away from the electronic component and a coupled system, thereby mitigating thermal and/or material exchange between the electronic component and the coupled system (e.g., a portion of an additive fabrication device). As a result of this technique, there may be a reduced risk of contaminant accumulation on the electronic component without increased thermal exchange between the electronic component and the coupled system. Accordingly, the electronic component may need less maintenance and/or cleaning, may have a reduced rate of failure, and/or may need to be replaced less frequently.

According to some embodiments, an apparatus may include at least one gas intake channel coupled to a primary channel, the primary channel including an orifice arranged at a first end. An electronic component (e.g., a sensor) may be arranged at least partially within the primary channel at a second end of the primary channel, with the second end opposing the first end of the primary channel. Gas directed through the intake channel may pass from the second end to the first end, thereby directing the gas past the electronic component, and away from the electronic component. As such, purging an apparatus may include directing a gas through the primary channel and past a sensor arranged at least partially within the primary channel.

According to some embodiments, an apparatus may include one or more structures coupled to the primary channel, such as one or more vessels, chambers, etc. for which thermal exchange between the primary channel and the structure(s) is undesirable. As discussed above, it may be desirable when operating a gas purge to mitigate thermal exchange between the purge and a coupled system. Such a coupled system may include any suitable structure or structures.

In some embodiments, at least one gas exhaust channel may be coupled to a side of the primary channel such that the at least one gas exhaust channel is oriented away from the electronic component. The gas may be directed out of the primary channel away from the sensor through at least one gas exhaust channel coupled to a side of the primary channel. The gas exhaust channel(s) may be shaped and/or oriented to harness the Coandă effect and to direct the gas away from the electronic component while also directing the gas away from a coupled system (e.g., including one or more vessels, chambers, etc.) coupled to the primary channel. In some cases, a gas pressure produced within the primary channel and/or the gas exhaust channel(s) may act to limit contaminants present within the coupled system from entering the primary channel and thereby potentially negatively impacting the electronic component. Examples of such relative pressure arrangements are discussed further below.

According to some embodiments, an additive fabrication device may include a sensor module coupled a chamber. The additive fabrication device may be configured to produce three-dimensional objects by sintering a source material. The additive fabrication device may further include a material deposition mechanism and a fabrication platform arranged within the chamber. The sensor module may be coupled to the additive fabrication device opposite the fabrication platform, and may include at least one gas intake channel coupled to a primary channel, the primary channel including an orifice arranged at a first end. An electronic component (e.g., a sensor, an optical sensor) may be arranged at least partially within the primary channel at a second end of the primary channel, the second end opposing the first end of the primary channel. In some embodiments, at least one gas exhaust channel may be coupled to a side of the primary channel such that the at least one gas exhaust channel is oriented away from the electronic component.

Following below are more detailed descriptions of various concepts related to, and embodiments of, techniques for gas purging of an electronic component. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

An illustrative sensor module 100 is illustrated in FIG. 1, in accordance with some embodiments of the technology described herein. In the example of FIG. 1, module 100 includes a gas intake channel 101 and a gas exhaust channel 104, both of which are coupled to a primary channel 102. Herein, the term "coupled" may refer to a direct coupling (e.g., direct attachment between components) and/or to an indirect coupling (e.g., indirect attachment between components, such as through a spacer component, tubing, wiring, etc.). An electronic component 103 is arranged within primary channel 102 at a first end 102a of primary channel 102 and opposite a second end 102b of primary channel 102. An orifice 105 is disposed at first end 102a.

In the example of FIG. 1, solid arrows depict an illustrative direction of net gas flow of clean gas within module 100 from the gas intake channel 101, past the electronic component 103, and out through the gas exhaust channel 104 and/or the orifice 105. Dashed arrows depict an illustrative direction of net gas flow of contaminated gas from the orifice 105 to the primary channel 102. As discussed above, it may be advantageous to configure sensor module 100 to minimize the amount of net gas flow of potentially contaminated gas or particulates from outside the orifice 105 into the primary channel 102, as this may limit contamination from entering the sensor module and reaching the electronic component 103. As such, a rate of the gas flow represented by the dashed arrow may be small. In some cases, a rate of gas flowing from the primary channel 102 out through the orifice 105 (represented by two solid arrows in FIG. 1) may also be small. For instance, gas flow from the gas intake channel 101 through the primary channel 102 and out through the gas exhaust channel 104 may be such that a pressure boundary is created at the orifice 105 which limits gas from entering and exiting the sensor module through the orifice.

In some embodiments, module 100 may include one or more devices configured to produce gas flow within and/or through the module 100. Such devices may include any number of devices arranged within module 100 (referred to subsequently as "internal" devices) and any number of devices arranged separately from, but coupled to, module 100 (referred to subsequently as "external" devices). The internal and/or external devices may include devices configured to push air into the module 100 (e.g., through the gas intake channel 101) and/or may include devices configured to pull air out of the module 100 (e.g., through the gas exhaust channel 104). Combinations of these types of devices may also be envisioned to produce a desired gas flow within the module 100.

For example, module 100 may include one or more internal fans coupled to gas intake channel 101 and/or gas exhaust channel 104. Fans may be oriented to produce a desired gas flow direction by pushing air through the fan in a desired direction. As another example, module 100 may be coupled to one or more external devices to provide a gas flow through the module. For instance, one or more external fans, gas compressors, and/or pressurized gas tanks may be coupled to gas intake channel 101 and may be operated to direct gas through gas intake channel 101 and into the primary channel 102. In some cases, module 100 may comprise a fan and/or a vacuum pump coupled to gas exhaust 104, which may be operated to pull gas through module 100. The gas may be any suitable gas, including air and/or an inert, purified gas (e.g., nitrogen or argon).

As shown in the example of FIG. 1, a gas intake channel 101 may be coupled to a side of primary channel 102. In some embodiments, a gas intake channel may be coupled to the second end 102b of primary channel 102 such that the gas intake is positioned behind the electronic component 103, as described in FIG. 2A. In general, any number of gas intake channels may be coupled to the primary channel and at any locations, such that gas may be directed into the primary channel from the gas intake channel(s).

In the example of FIG. 1, gas intake channel 101 is shown coupled to the side of primary channel 102 at an orthogonal angle, a, in accordance with some embodiments described herein. However, is to be appreciated that in some embodiments, gas intake channel 101 may be coupled to primary channel 102 at an obtuse angle (e.g., wherein a is between 90° and 180°) such that the gas intake channel 101 is oriented away from first end 102a of the primary channel 102. Further, though only a single gas intake channel 101 is shown in the example of FIG. 1, it is to be appreciated that multiple gas intake channels 101 could be employed, as described in FIGS. 2A and 2D. In such embodiments, the gas intake channels 101 may be disposed on different sides (e.g., opposite sides) of the primary channel 102 and/or may be arrayed along the length of the primary channel 102 from second end 102b to first end 102a. As referred to herein, opposing sides may refer to two sides disposed such that the primary channel is positioned in between the two sides.

As shown in the example of FIG. 1, electronic component 103 may be arranged within primary channel 102 at the second end 102b of primary channel 102. In other embodiments, electronic component 103 may be arranged only partially within primary channel 102. In some embodiments, electronic component 103 may comprise one or more sensors, such as but not limited to an optical sensor, a temperature sensor, a sound sensor, a motion sensor, a pressure sensor, a force sensor, a capacitance sensor, or combinations thereof. For instance, in some embodiments electronic component 103 may be, or may comprise, an optical sensor arranged to detect and/or monitor a temperature (e.g., a pyrometer, an infrared sensor). In general, however, electronic component 103 may include any electronic component for which it is desirable to avoid contamination of the component, which is not limited to sensors.

In some embodiments, and as shown in the example of FIG. 1, electronic component 103 may be arranged within primary channel 102 a distance L1 from first end 102a and orifice 105. Distance L1 may be selected based on a desired field-of-view (FOV) of electronic component 103. In some embodiments, distance L1 may be greater than or equal to 4 cm, 5 cm, 6 cm, 8 cm, 10 cm, or 15 cm. In some embodiments, distance L1 may be less than or equal to 40 cm, 30 cm, 20 cm, 15 cm, 10 cm, 8 cm, or 6 cm. Any suitable combinations of the above-referenced ranges are also possible (e.g., L1 is greater than or equal to 4 cm and less than or equal to 8 cm or L1 is greater than or equal to 5 cm and less than or equal to 15 cm). Alternatively or additionally, in some embodiments the FOV may be determined according to an angle φ formed by a width of the orifice 105. In some embodiments, the angle φ of the electronic component may be greater than or equal to 5°, 10°, 15°, or 20°. In some embodiments, the angle φ may be less than or equal to 10°, 15°, 20°, 25°, 30°, 35°, 40°, or 45°. Any suitable combinations of the above-referenced ranges are also possible (e.g., the angle ¢ is greater or equal to 5° and less than or equal to 45° or the angle φ is greater or equal to 10° and less than or equal to) 30°.

Gas exhaust channel 104 may be coupled to a side of primary channel 102, in accordance with some embodiments of the technology described herein. Gas exhaust channel 104 may be coupled to a same side of primary channel 102 as gas intake channel 101 or, as shown in the example of FIG. 1, a different side of primary channel 102 as gas intake channel 101. In some embodiments, gas exhaust channel 104 may be coupled to a side of primary channel 102 which opposes the side which is coupled to gas intake channel 101. It may be appreciated that while the example of FIG. 1 shows a single gas exhaust channel 104, in some embodiments there may be multiple gas exhaust channels 104, as described in connection with FIGS. 2A and 2D. Alternatively, in some embodiments, rather than comprising one or more discrete exhaust channels as shown in the examples of FIGS. 1 and 2A-2D, gas exhaust channel 104 may comprise a continuous exhaust channel which encircles or partially encircles the primary channel 102.

Gas exhaust channel 104 may be coupled to the side of primary channel 102 at an angle θ relative to the side of primary channel 102, in accordance with some embodiments. The gas exhaust channel may be oriented away from electronic component 103. The angle θ may be selected to harness the Coandă effect, in which fluid flow tends to follow a convex surface, such that the gas flowing through module 100 may follow the surface of the gas exhaust channel 104 while exiting the module 100. The angle θ may also be selected to reduce or eliminate gas exchange through orifice 105. The angle θ may accordingly be an obtuse angle (e.g., between 90° and 180°) such that gas exhaust 103 is oriented away from electronic component 103.

In some embodiments, gas exhaust channel 104 may be straight. As referred to herein, "straight" may refer to a channel which may be completely straight, approximately straight, or that includes a plurality of straight portions with one or more bends in between. In the example of FIG. 1, in which the gas exhaust channel 104 includes at least one straight portion as pictured, an angle θ may be formed between the primary channel 102 and the gas exhaust channel 104. While in the example of FIG. 1, the angle θ is formed at a point at which the gas exhaust channel 104 and primary channel 102 meet, it will be appreciated that the angle θ may also be formed between the sides of gas exhaust channel 104 and primary channel 102, which may be joined by a continuously curved or sloping surface at the location of the coupling between primary channel 102 and gas exhaust channel 104, as shown in the examples of FIGS. 2B and 2C. Such a curved surface may enhance the Coandă effect, increasing the amount of gas flow directed out of module 100 through gas exhaust channel 104. In such embodiments, gas exhaust channel 104 may also be curved, or may include at least one curved portion.

As discussed above, in the example of FIG. 1, orifice 105 is disposed at the first end 102a of primary channel 102. Orifice 105 may open into a coupled system (e.g., into a chamber or other portion of a device the module 100 may be coupled to). Orifice 105 may provide an opening so that electronic component 103 may perform a function (e.g., monitoring, detecting) within the coupled system.

When coupled to another system, the net gas flow within the module 100 may reduce or eliminate contaminated gas flow into the module 100 through the orifice 105, in accordance with some embodiments. The gas exhaust channels 104 may be sloped such that the Coandă effect channels gas out through the gas exhaust channels 104, maintaining a positive pressure of clean gas flow within the module 100. Such a positive pressure may prevent contaminated gas from a coupled system from entering the module 100 and/or from adhering to electronic component 103. In some embodiments, and as shown in the example of FIG. 1, first end 102a and orifice 105 may be disposed a distance L2 along the primary channel from the location where the gas exhaust channel 104 is coupled to the primary channel 102. The distance L2 may be any suitable distance, and in some embodiments may be greater than or equal to 1 cm, 2 cm, or 4 cm. In some embodiments, the distance L2 may be less than or equal to 6 cm, 4 cm, or 2 cm. Any suitable combinations of the above-referenced ranges are also possible (e.g., L2 is greater than or equal to 1 cm and less than or equal to 6 cm, or L2 is greater than or equal to 2 cm and less than or equal to 4 cm). In some embodiments, the distance L2 may be less than 1 cm, such that the orifice 105 is disposed proximate the gas exhaust channel 104.

Figure 2A:
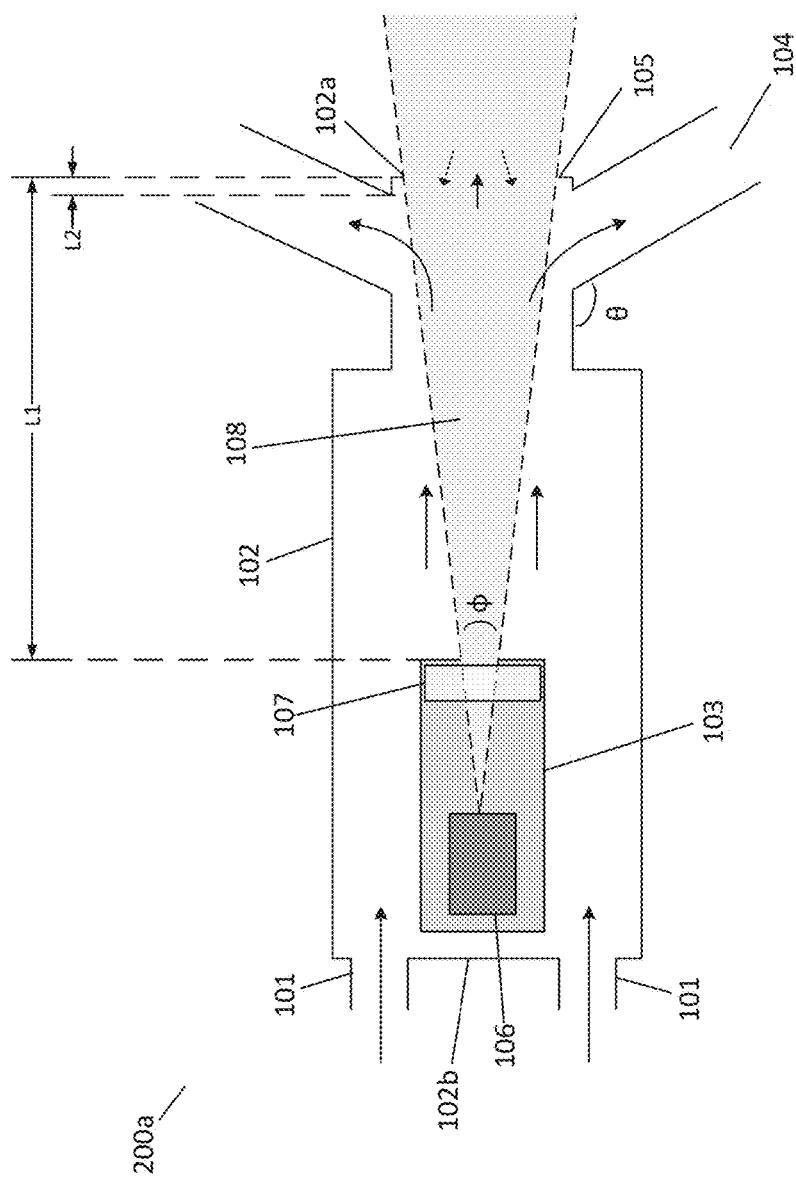
FIGS. 2A-2D depict alternative examples of an electronic component module, according to some embodiments.
Figure 2B:
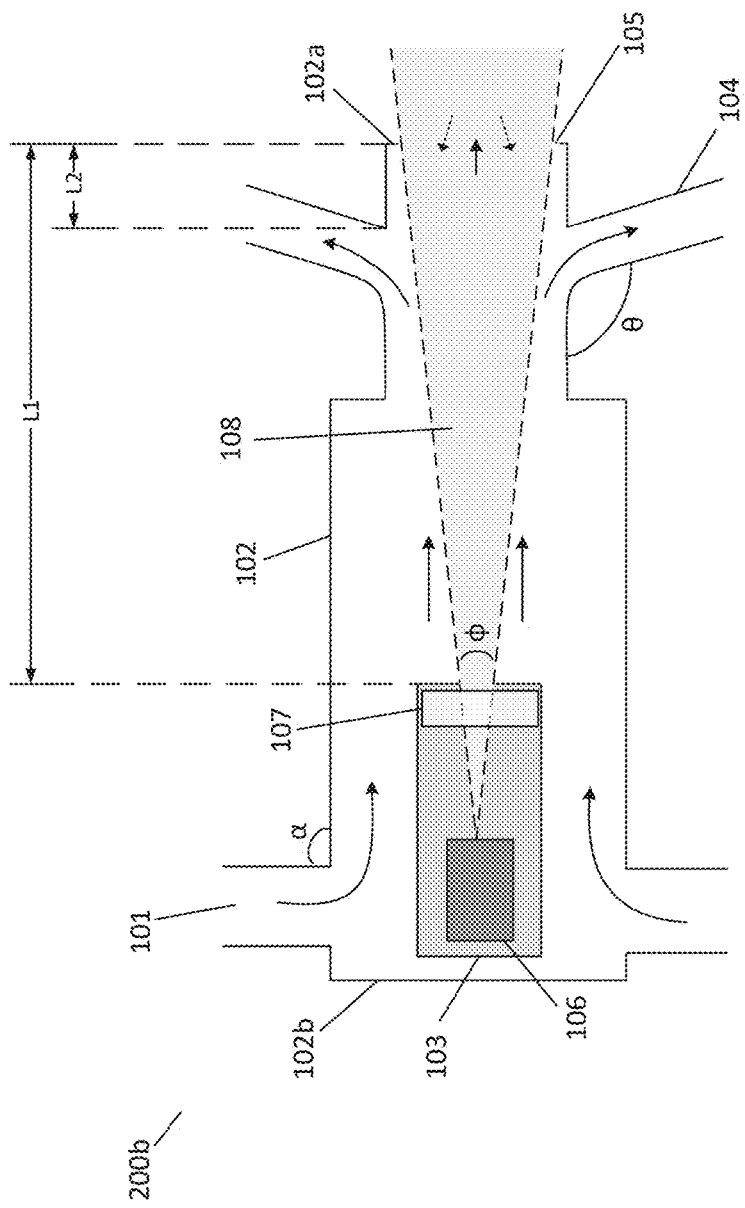
Figure 2C:
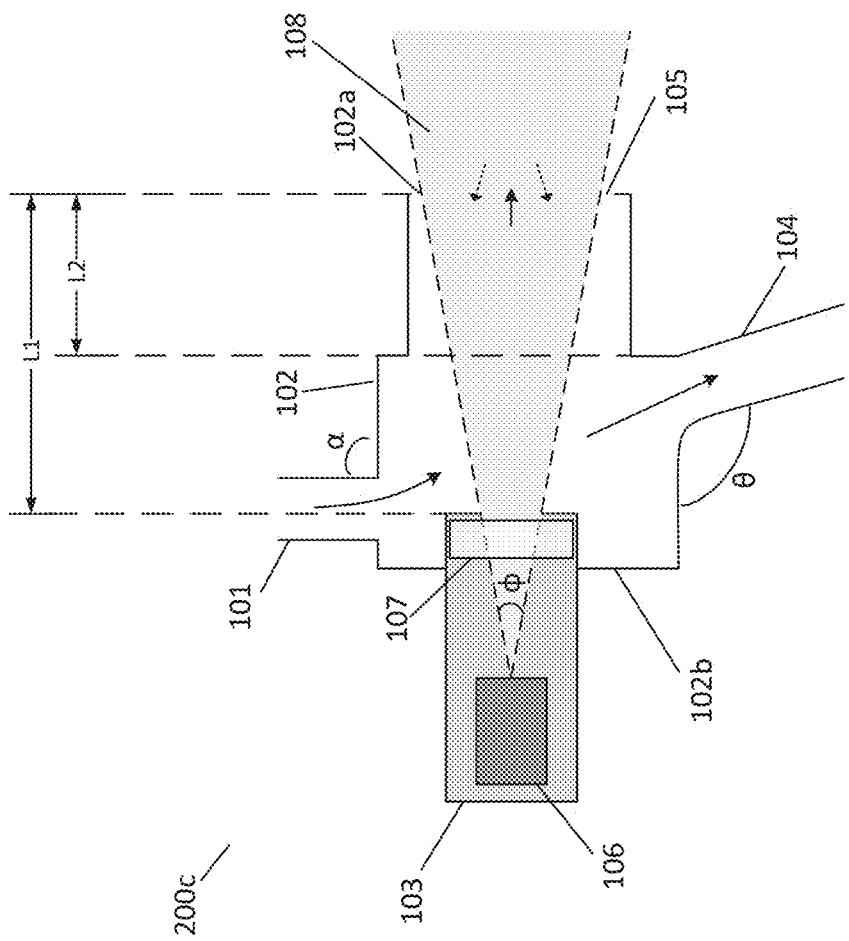

FIG. 2A depicts an example of an sensor module 200a, in accordance with some embodiments of the technology described herein. Module 200a includes two gas intake channels 101 and two gas exhaust channels 104, each coupled to primary channel 102. The two gas intake channels 101 may be coupled to a second end 102b of primary channel 102, and the two gas exhaust channels 104 may be coupled to sides of primary channel 102 proximate a first end 102a of primary channel 102. Module 200a further includes an electronic component 103 disposed within the primary channel 102. Arrows show a direction of gas flow within module 100 from the gas intake channels 101, past the electronic component 103, and out through the gas exhaust channels 104.

In the example of FIG. 2A, the electronic component 103 is shown as a sensor 106 including an optical window 107, but the electronic component 103 may be any suitable electronic device as described previously in connection with FIG. 1. Optical window 107 may comprise, or may consist of, an optically transparent material so that optical window 107 may protect sensor 106 while still allowing sensor 106 to perform a desired function. Optical window 107, for example, may comprise any suitable optically transparent material, such as but not limited to silica, silicon, N-BK7, B270, sodium chloride, zinc selenide, zinc sulfide, magnesium fluoride, calcium fluoride, barium fluoride, germanium, sapphire, or combinations thereof. In some embodiments, the sensor 106 may be an optical sensor configured to detect a temperature (e.g., a pyrometer or an infrared sensor). In such embodiments, the optical window 107 may be a germanium optical window.

In some embodiments, the sensor 106 may have a field of view (FOV) 108 through the orifice 105 and out of the module 200a. The FOV 108 may be defined by an angle $\phi$. The angle $\phi$ may be determined by a width of orifice 105 and/or the distance L1 between orifice 105 and the sensor 106. For example, in some embodiments the angle $\phi$ of the electronic component may be greater than or equal to 5°, 10°, 15°, or 20°. In some embodiments, the angle $\phi$ may be less than or equal to 15°, 20°, 25°, 30°, 35°, 40°, or 45°. Any suitable combinations of the above-referenced ranges are also possible (e.g., the angle $\phi$ is greater or equal to 5° and less than or equal to 45° or the angle $\phi$ is greater or equal to 10° and less than or equal to) 30°.

In some embodiments, a width of the orifice 105 may be greater than or equal to 1 cm, 2 cm, or 3 cm. In some embodiments, the width of the orifice 105 may be less than or equal to 4 cm, 3 cm, or 2 cm. Any suitable combinations of the above-referenced ranges are also possible (e.g., the width of orifice 105 may be greater than or equal to 1 cm and less than or equal to 4 cm or the width of the orifice 105 may be greater than or equal to 2 cm and less than or equal to 3 cm).

FIG. 2B depicts an example of a sensor module 200b, in accordance with some embodiments of the technology described herein. In the example of FIG. 2B, module 200b includes two gas intake channels 101 coupled to sides of primary channel 102 and proximate a second end 102a of primary channel 102. The gas intake channels 101 are shown as being coupled to the primary channel 102 at an orthogonal angle, α. However, as described in connection with FIG. 1, the angle α may be an obtuse angle (between 90° and 180°).

Additionally, as shown in the example of FIG. 2B, gas intake channels 101 are coupled to different sides of primary channel 102. In some embodiments, the different sides may be opposing sides. Alternatively, in other embodiments, the gas intake channels 101 may be coupled to a same side of the primary channel 102 and arrayed along the length of primary channel 102.

FIG. 2C depicts an example of a sensor module 200c, in accordance with some embodiments of the technology described herein. In the example of FIG. 2C, module 200c includes a single gas intake channel 101 and a single gas exhaust channel 104, both coupled to primary channel 102. The gas exhaust channel 104 is coupled to the primary channel 102 at a location a distance L2 from the orifice 105, as described in connection with FIG. 1.

In the example of FIG. 2C, the electronic component 103 is partially disposed within primary channel 102, in accordance with some embodiments. For example, in an optical sensing application, the optical window 107 may be disposed within the module 200c while the sensor 106 is disposed outside of the module. Such an arrangement may reduce a distance L1 between the sensor 106 and the orifice 105 such that the FOV 108 of the electronic component 103 may be increased. Alternatively, such an arrangement may reduce the overall size of the sensor module 200c and/or allow for configurations of other components (e.g., external electronics, electronic connections) around the sensor 106.

Figure 2D:
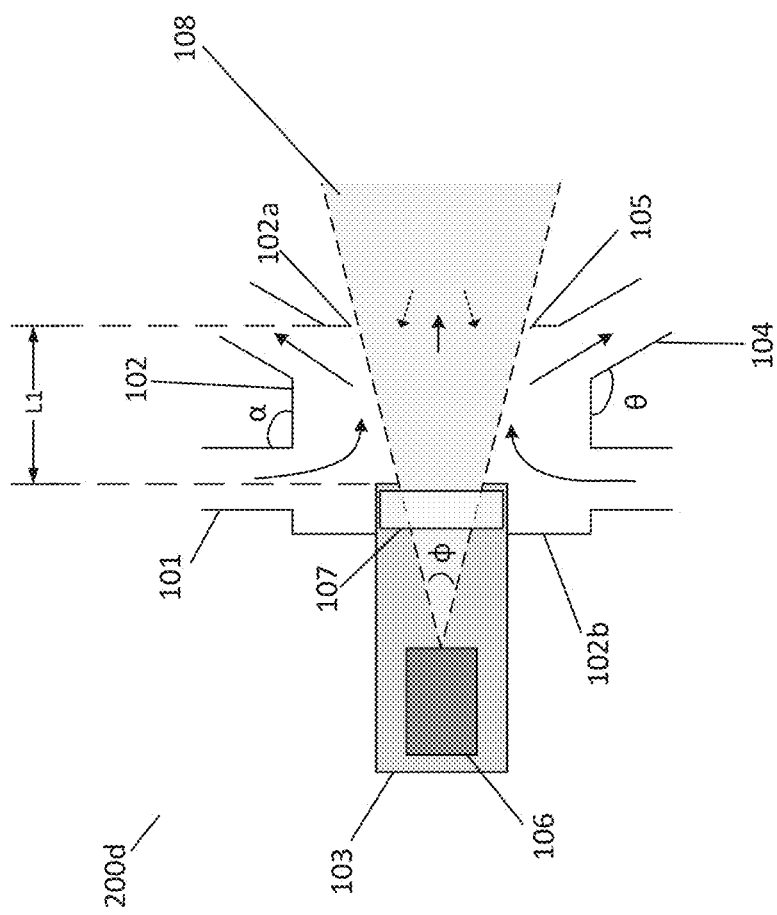

FIG. 2D depicts an example of a sensor module 200d, in accordance with some embodiments of the technology described herein. Module 200d is similar to module 200c of FIG. 2C, but includes two gas intake channels 101 and two gas exhaust channels 104 coupled to the primary channel 102. The gas exhaust channels 104 are coupled to the primary channel 102 at a location proximate the orifice (e.g., L2 approximately equal to 0).

Figure 3:
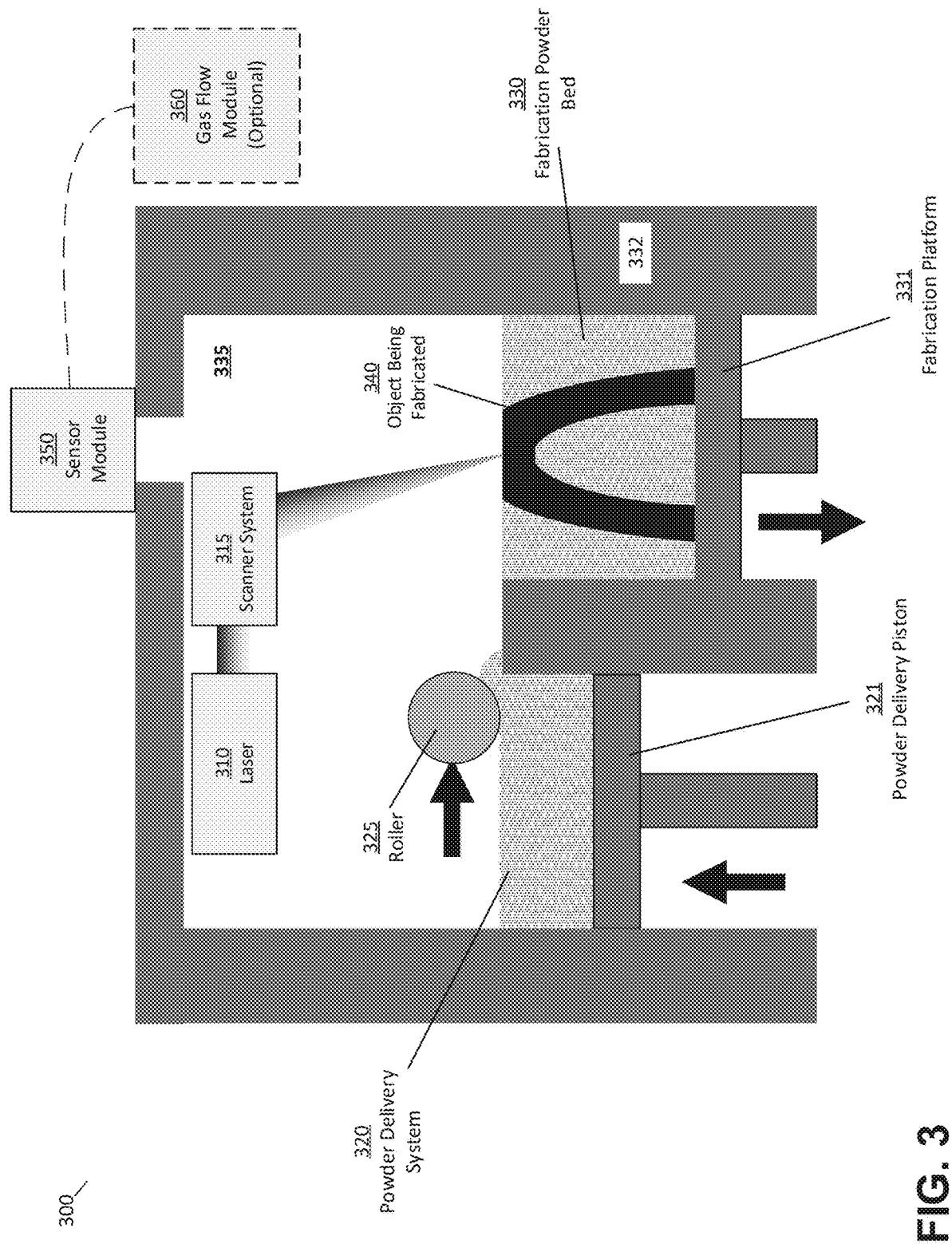
FIG. 3 depicts an illustrative selective laser sintering device, according to some embodiments.

An illustrative conventional selective laser sintering (SLS) additive fabrication device is illustrated in FIG. 3. In the example of FIG. 3, SLS device 300 comprises a laser 310 paired with a computer-controlled scanner system 315 disposed to operatively aim the laser 310 at the fabrication bed 330 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 3, the material in the fabrication bed 330 is selectively heated by the laser in a manner that causes the powder material particles to fuse (sometimes also referred to as "sintering" or "consolidating") such that a new layer of the object 340 is formed. SLS is suitable for use with many different powdered materials, including any of various forms of powdered nylon. In some cases, areas around the fabrication bed (e.g., the interior of the chamber 335, the walls 332, the platform 331, etc.) may include heating elements to heat the powder in the fabrication bed. Such heaters may be used to preheat unconsolidated material prior to consolidation via the laser.

Once a layer has been successfully formed, the fabrication platform 331 may be lowered a predetermined distance by a motion system (not pictured in FIG. 3). Once the fabrication platform 331 has been lowered, the material deposition mechanism 325 may be moved across the fabrication bed 330, spreading a fresh layer of material across the fabrication bed 330 to be consolidated as described above. Mechanisms configured to apply a consistent layer of material onto the fabrication bed may include the use of wipers, rollers, blades, and/or other levelling mechanisms for moving material from a source of fresh material to a target location.

As discussed above, it is highly desirable in a system such as system 300 shown in FIG. 3 to wait for unconsolidated material that is delivered onto the fabrication bed 330 to reach a consistent temperature before consolidating the material with the laser 310. In some additive fabrication systems, the unconsolidated material is preheated to a temperature that is sufficiently high so as to require minimal additional energy exposure to trigger consolidation. For instance, some SLS devices use radiating heating elements (not shown) that aim to consistently and uniformly heat both the uppermost layer and the volume of the material to a temperature below, but close to, the critical temperature for consolidation. Since consolidation of material typically occurs at or above a critical temperature, producing parts as intended requires effective management of temperature within the material.

For these reasons, it may be desirable to monitor the temperature of the uppermost layer of unconsolidated material during an additive fabrication process. In some instances, such monitoring may be performed by an electronic component of the additive fabrication device. The electronic component (e.g., an optical sensor) may be positioned with a FOV directed towards the uppermost layer of the unconsolidated material. However, maintaining the unconsolidated material at an elevated temperature may cause the unconsolidated material and/or other components of the system to outgas contaminants into chamber 335. The contaminant may then subsequently condense or otherwise settle on the electronic component.

In the example of FIG. 3, such an electronic component may be shielded from contamination by gas flow within sensor module 350, which may be coupled to an exterior of the SLS device 300 such that the sensor module is connected to the chamber 335. Sensor module 350 may be any one of sensor modules 100, 200a-d, or any suitable combination of features of said modules 100 and/or 200a-d, as described in connection with FIG. 1 and FIGS. 2A-2D. Sensor module 350 may be arranged so that the electronic component (e.g., electronic component 103) may monitor the uppermost layer of the unconsolidated material from directly above (as shown in FIG. 3) or at an angle to the uppermost layer of the unconsolidated material (e.g., from the side of the fabrication powder bed 330). In some embodiments, multiple sensor modules 350 may be coupled to the SLS device 300, the multiple sensor modules comprising the same or different electronic components than one another, and configured to perform the same or different functions than one another within the SLS device 300.

In the example of FIG. 3, the sensor module 350 may be arranged so that the opening within the walls 332 between the sensor module and the chamber 335 acts as the orifice of any of the sensor modules 100 and/or 200a-d, as described in connection with FIG. 1 and FIGS. 2A-2D. In some cases, the orifice of the sensor module may be coupled to the opening of the chamber 335. For instance, the orifice of the sensor module may include a mating connector and the opening of the chamber may include a corresponding mating connector such that the sensor module may be removably coupled to the chamber.

In some embodiments, sensor module 350 may be coupled to an external gas flow module 360. Gas flow module 360 may include one or more gas flow mechanisms including fans, gas compressors, and/or vacuum pumps to direct gas through sensor module 350, as discussed in connection with FIG. 1. Alternatively, sensor module 350 may include an integrated gas flow mechanism (e.g., a fan, pump, and/or compressor, not shown) such that an external gas flow module 360 is not needed to direct gas through sensor module 350 during operation.

Figure 4:
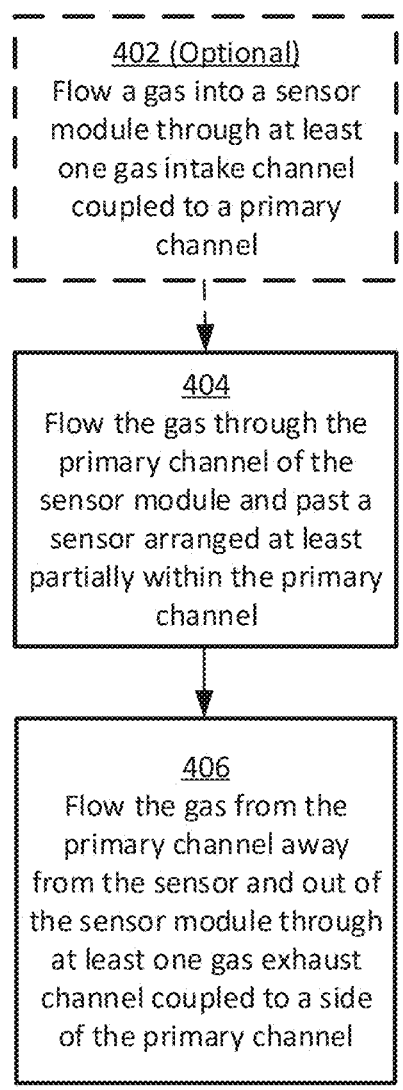
FIG. 4 is a flowchart describing a process for purging an electronic component module, according to some embodiments.

FIG. 4 depicts a flowchart describing a process 400 for purging a sensor module such as modules 100 and/or modules 200a-d, in accordance with some embodiments of the technology described herein.

At act 402, a gas may be directed into the module through at least one gas intake channel (e.g., gas intake channel(s) 101), in accordance with some embodiments. The at least one gas intake channel may be coupled to a primary channel (e.g., primary channel 102) of the module such that gas flows from the gas intake channel into the primary channel. The gas may be directed into the gas intake channel by means of one or more gas flow mechanisms (e.g., a fan, a compressor, and/or a vacuum pump).

In some embodiments, the gas flow mechanism may be operated in response to computer-implemented instructions from a processor coupled to the module, to the gas flow mechanism, and/or to a system coupled to the module (e.g., additive fabrication device 300 of FIG. 3). The computer-implemented instructions may thereby, when executed, cause gas to flow through the module in a continuous manner over a period of time. The period of time may coincide with a function of the system coupled to the module (e.g., a manufacturing process). For example, when coupled to an additive fabrication device, the computer-implemented instructions may cause gas to flow through the module in a continuous manner while the additive fabrication device performs an additive manufacturing process (as described in connection with FIG. 3).

At act 404, the gas may be directed through the primary channel past an electronic component (e.g., electronic component 103), in accordance with some embodiments. The electronic component may be arranged at least partially within the primary channel. For example, the electronic component may be arranged completely within the primary channel (e.g., as in the examples of FIGS. 1, 2A, and 2B) or may have only a portion arranged within the primary channel (e.g., as in the examples of FIGS. 2C and 2D).

At act 406 the gas may be directed out from the primary channel away from the electronic component. The gas may be directed out of the module through at least one gas exhaust channel (e.g., gas exhaust channel 104). The gas exhaust channel may be coupled to a side of the primary channel so that the gas is directed away from the electronic component. Such a gas flow pattern as described in process 400 may reduce the amount of contaminants that reach and/or adhere to the electronic component.

Figure 5:
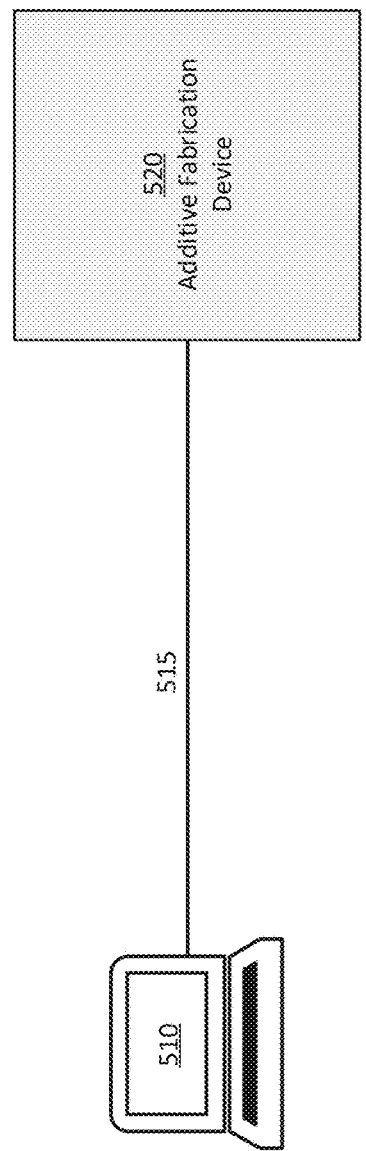
FIG. 5 is a block diagram of a system suitable for practicing aspects of the technology, according to some embodiments.

FIG. 5 is a block diagram of a system suitable for practicing aspects of the invention, according to some embodiments. System 500 illustrates a system suitable for generating instructions to perform additive fabrication by a device including a gas-purged sensor module, and subsequent operation of the additive fabrication device to fabricate an object. For instance, instructions to fabricate the object using an additive fabrication device, such as device 300 shown in FIG. 3, may comprise instructions to operate one or more gas flow mechanisms (e.g., to operate gas flow module 360 or to operate integrated gas flow mechanisms within sensor module 350). In some cases, the instructions may also, when executed by the additive fabrication device, cause the additive fabrication device to operate an energy source in concert with the gas flow mechanisms.

According to some embodiments, computer system 510 may execute software that generates two-dimensional layers that may each comprise sections of the object. Instructions may then be generated from this layer data to be provided to an additive fabrication device, such as additive fabrication device 520, that, when executed by the device, fabricates the layers and thereby fabricates the object. Such instructions may be communicated via link 515, which may comprise any suitable wired and/or wireless communications connection. In some embodiments, a single housing holds the computing device 510 and additive fabrication device 520 such that the link 515 is an internal link connecting two modules within the housing of system 500.

Figure 6:
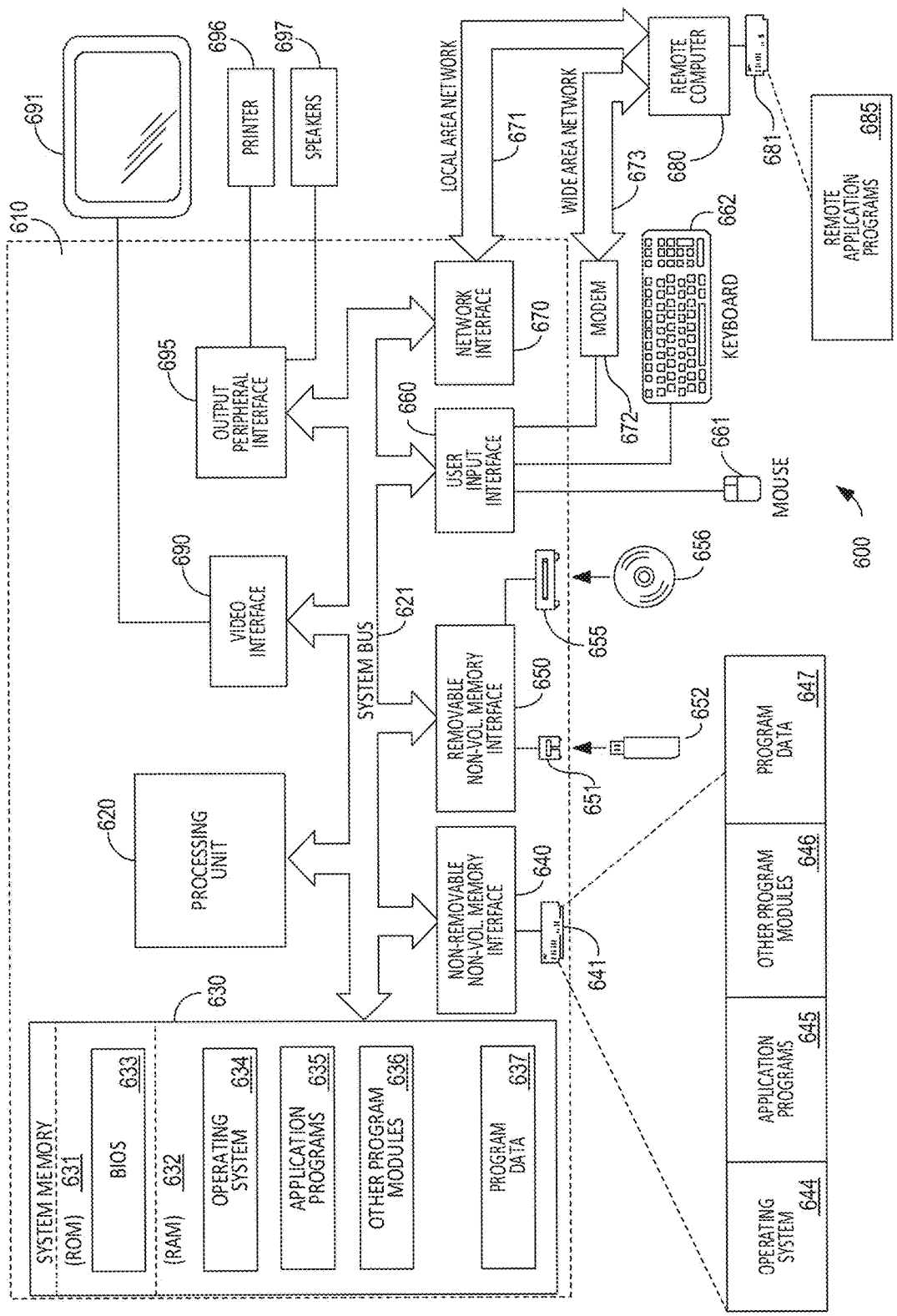
FIG. 6 illustrates an example of a computing system environment on which aspects of the technology described herein may be implemented.

FIG. 6 illustrates an example of a suitable computing system environment 600 on which the technology described herein may be implemented. For example, computing environment 600 may form some or all of the computer system 510 shown in FIG. 5. The computing system environment 600 is only one example of a suitable computing environment and is not intended to suggest any limitation as to the scope of use or functionality of the technology described herein. Neither should the computing environment 600 be interpreted as having any dependency or requirement relating to any one or combination of components illustrated in the exemplary operating environment 600.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the technology described herein includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a flash drive 651 that reads from or writes to a removable, nonvolatile memory 652 such as flash memory, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment, it is to be appreciated that various alterations, modifications, and improvements will readily occur to those skilled in the art.

Such alterations, modifications, and improvements are intended to be part of this disclosure, and are intended to be within the spirit and scope of the technology described herein. Further, though advantages of the present technology are indicated, it should be appreciated that not every embodiment described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present technology may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way.

Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The terms "orthogonal" and "perpendicular" may be used to refer to values that are within ±20% of a comparative measure in some embodiments, within ±10% in some embodiments, within ±5% in some embodiments, and yet within ±2% in some embodiments. For example, a first direction that is "orthogonal" or "perpendicular" to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electronic component module, comprising:
    at least one gas intake channel;
    a primary channel coupled to the at least one gas intake channel via at least one first opening in the primary channel, the primary channel having a first end, a second end opposing the first end, and a first side and a second side each extending from the first end to the second end, and the primary channel comprising an orifice at the first end of the primary channel, the orifice configured to provide a second opening from the primary channel into a system coupled to the electronic component module;
    an electronic component arranged at least partially within the primary channel at the second end of the primary channel such that the electronic component is arranged between the at least one gas intake channel and the orifice; and
    a first gas exhaust channel coupled to the first side of the primary channel via a third opening in the primary channel, the first gas exhaust channel being arranged between the electronic component and the orifice, wherein an angle formed between the first side of the primary channel and sides of the first gas exhaust channel is greater than 90° and less than 180°, such that the first gas exhaust channel is oriented away from the electronic component.

2. The electronic component module of claim 1, wherein the first gas exhaust channel is coupled to the first side of the primary channel at a location proximate the orifice.

3. The electronic component module of claim 1, wherein the at least one gas intake channel is coupled to the first side of the primary channel.

4. The electronic component module of claim 1, wherein the at least one gas intake channel comprises a first gas intake channel and a second gas intake channel, the first gas intake channel coupled to the first side of the primary channel and the second gas intake channel coupled to a second side of the primary channel, the second side different than the first side.

5. The electronic component module of claim 1, wherein the at least one gas intake channel is coupled to the second end of the primary channel.

6. The electronic component module of claim 1, wherein the at least one gas intake channel comprises at least two gas intake channels.

7. The electronic component module of claim 1, further comprising a second gas exhaust channel coupled to the second side of the primary channel via a fourth opening in the primary channel.

8. The electronic component module of claim 1, wherein the at least one gas intake channel is coupled to at least one fan.

9. The electronic component module of claim 1, wherein the at least one gas intake channel is coupled to at least one air compressor.

10. The electronic component module of claim 1, wherein the first gas exhaust channel is coupled to at least one fan.

11. The electronic component module of claim 1, wherein the first gas exhaust channel is coupled to at least one vacuum pump.

12. The electronic component module of claim 1, wherein the electronic component is an optical sensor.

13. The electronic component module of claim 12, wherein the optical sensor is at least one of a pyrometer or an infrared sensor.

14. The electronic component module of claim 12, wherein the optical sensor comprises an optical window.

15. The electronic component module of claim 14, wherein the optical window is a germanium optical window.

16. The electronic component module of claim 14, wherein the optical window is arranged within the primary channel.

17. The electronic component module of claim 1, wherein the electronic component has an optical field of view through the orifice in a range from 10° to 25°.

18. The electronic component module of claim 1, wherein the electronic component has an optical field of view through the orifice in a range from 15° to 20°.

19. The electronic component module of claim 1, wherein the first gas exhaust channel is a straight gas exhaust channel.

20. The electronic component module of claim 1, wherein the first side of the primary channel and one of the sides of the first gas exhaust channel meet at a point, thereby forming the angle between the first side of the primary channel and the sides of the first gas exhaust channel.

21. The electronic component module of claim 1,
wherein the first side of the primary channel and the sides of the first gas exhaust channel include a respective straight portion that are oriented with respect to one another at the angle, and
wherein the first side of the primary channel and/or the sides of the first gas exhaust channel include a curved portion in between the straight portion of the first side of the primary channel and the straight portion of the sides of the first gas exhaust channel.

22. The electronic component module of claim 1, wherein the first gas exhaust channel is coupled to the first side of the primary channel at a location disposed at a distance more than 1 cm from the orifice.

23. The electronic component module of claim 1, wherein the at least one gas intake channel is coupled to the primary channel at an obtuse angle such that the at least one gas intake channel is oriented away from the first end of the primary channel.

24. The electronic component module of claim 1, further comprising a second gas exhaust channel coupled to the second side of the primary channel, and wherein:
the at least one gas intake channel comprises two gas intake channels coupled to the second end of the primary channel.

25. The electronic component module of claim 1, further comprising a second gas exhaust channel coupled to the second side of the primary channel, and wherein:
the at least one gas intake channel comprises two gas intake channels, each gas intake channel of the two gas intake channels being coupled to a different side of the primary channel.

26. The electronic component module of claim 1, further comprising a second gas exhaust channel coupled to the second side of the primary channel, and wherein:
the at least one gas intake channel comprises a first gas intake channel coupled to the first side of the primary channel, and a second gas intake channel coupled to the second side of the primary channel; and
the electronic component comprises an optical window, the optical window being disposed within the primary channel.

27. The electronic component module of claim 1, wherein a distance along the first side of the primary channel between the orifice and the third opening is less than 1 cm.

28. The electronic component module of claim 1, wherein the first gas exhaust channel is arranged such that the Coanda effect channels gas entering the primary channel through the at least one gas intake channel out through the first gas exhaust channel, and prevents gas entering the primary channel through the orifice.

* * * * *